United States Patent
Das et al.

(10) Patent No.: US 9,334,749 B2
(45) Date of Patent: May 10, 2016

(54) AUXILIARY POWER SYSTEM FOR TURBINE-BASED ENERGY GENERATION SYSTEM

(71) Applicant: ABB Technology AG, Zurich (CH)

(72) Inventors: Debrup Das, Raleigh, NC (US);
Sandeep Bala, Raleigh, NC (US)

(73) Assignee: ABB Technology AG, Zurich (CH)

( * ) Notice: Subject to any disclaimer, the term of this patent is extended or adjusted under 35 U.S.C. 154(b) by 93 days.

(21) Appl. No.: 14/057,572

(22) Filed: Oct. 18, 2013

(65) Prior Publication Data
US 2015/0108755 A1    Apr. 23, 2015

(51) Int. Cl.
*F01D 15/10*    (2006.01)
*H02J 3/38*    (2006.01)
(Continued)

(52) U.S. Cl.
CPC . *F01D 15/10* (2013.01); *H02J 3/38* (2013.01); *H02J 9/061* (2013.01); *H02H 1/06* (2013.01); *H02J 3/32* (2013.01)

(58) Field of Classification Search
CPC ............. H02M 2001/0067; H02M 2001/0074; H02M 1/10; H02M 5/40; H02K 47/02; H02K 47/06; H02K 47/18; Y02E 10/76; Y02E 10/763; F01D 15/10; H02J 9/061; H02J 3/38; H02J 3/32; H02H 1/06
USPC ............................. 290/42, 43, 44, 53, 54, 55; 700/286–290; 307/43–87
See application file for complete search history.

(56) References Cited

U.S. PATENT DOCUMENTS 3,764,815 A * 10/1973 Habock et al. .................. 290/52
3,909,697 A    9/1975 Depenbrock
(Continued)

FOREIGN PATENT DOCUMENTS

CN    201966683 U    9/2011
CN    202172281 U    3/2012
(Continued)

OTHER PUBLICATIONS

Chen, Z., et al, "A Review of the State of the Art of Power Electronics for Wind Turbines," IEEE Transactions on Power Electronics, Aug. 2009, pp. 1859-1875, vol. 24, No. 8, IEEE Power Electronics Society.
(Continued)

*Primary Examiner* — Tulsidas C Patel
*Assistant Examiner* — Viet Nguyen
(74) *Attorney, Agent, or Firm* — Taft Stettinius & Hollister LLP

(57) ABSTRACT

A turbine-based energy generation system includes an electric generator and auxiliary load. A power system for the turbine-based energy generation system includes a main converter and an auxiliary converter. The main converter is operable to deliver power generated by the electric generator to a power collection system external to the turbine-based energy generation system when the main converter is coupled to the generator. The main converter is also operable to deliver power provided from the power collection system to the auxiliary converter when the main converter is decoupled from the generator. The auxiliary converter is operable to deliver power generated by the electric generator to the auxiliary load when the auxiliary converter is coupled to the generator. The auxiliary converter is also operable to deliver the power provided by the main converter from the power collection system to the auxiliary load when the auxiliary converter is decoupled from the generator.

20 Claims, 8 Drawing Sheets

(51) Int. Cl.
*H02J 9/06* (2006.01)
*H02H 1/06* (2006.01)
*H02J 3/32* (2006.01)

(56) References Cited

U.S. PATENT DOCUMENTS

| | | | |
|---|---|---|---|
| 4,335,424 A | 6/1982 | Zabar | |
| 5,170,334 A | 12/1992 | Ito et al. | |
| 5,446,643 A | 8/1995 | McMurray et al. | |
| 5,715,151 A | 2/1998 | Moriura | |
| 6,434,020 B1 | 8/2002 | Lambert et al. | |
| 6,487,096 B1 | 11/2002 | Gilbreth et al. | |
| 6,958,550 B2* | 10/2005 | Gilbreth et al. | 290/52 |
| 7,218,012 B1 | 5/2007 | Edenfeld | |
| 7,397,143 B2* | 7/2008 | Walling | 290/44 |
| 7,449,794 B2 | 11/2008 | Guey et al. | |
| 7,602,074 B2 | 10/2009 | Voss | |
| 7,952,232 B2 | 5/2011 | Burra et al. | |
| 8,018,083 B2 | 9/2011 | Larsen et al. | |
| 8,138,620 B2* | 3/2012 | Wagoner et al. | 290/44 |
| 8,174,138 B2 | 5/2012 | Castelli Dezza et al. | |
| 8,188,610 B2 | 5/2012 | Scholte-Wassink | |
| 8,330,296 B2 | 12/2012 | Ottman | |
| 8,436,490 B2 | 5/2013 | Gertmar | |
| 2002/0079706 A1 | 6/2002 | Rebsdorf et al. | |
| 2004/0026929 A1 | 2/2004 | Rebsdorf et al. | |
| 2004/0080164 A1* | 4/2004 | McKelvey et al. | 290/52 |
| 2006/0192390 A1 | 8/2006 | Juanarena Saragueta et al. | |
| 2007/0132248 A1 | 6/2007 | Weng et al. | |
| 2007/0228836 A1 | 10/2007 | Teichmann | |
| 2008/0001408 A1 | 1/2008 | Liu et al. | |
| 2008/0129120 A1 | 6/2008 | Su et al. | |
| 2008/0252267 A1* | 10/2008 | Lando et al. | 322/90 |
| 2008/0303489 A1 | 12/2008 | Park et al. | |
| 2009/0230689 A1* | 9/2009 | Burra et al. | 290/55 |
| 2009/0322083 A1 | 12/2009 | Wagoner et al. | |
| 2010/0045040 A1 | 2/2010 | Bendixen et al. | |
| 2010/0060000 A1* | 3/2010 | Scholte-Wassink | 290/44 |
| 2010/0124087 A1* | 5/2010 | Falk | 363/131 |
| 2010/0270864 A1* | 10/2010 | Vyas et al. | 307/82 |
| 2011/0013441 A1 | 1/2011 | Gruber et al. | |
| 2011/0042965 A1 | 2/2011 | Atallah et al. | |
| 2011/0049994 A1 | 3/2011 | Hiller et al. | |
| 2011/0057443 A1 | 3/2011 | Rivas et al. | |
| 2011/0057631 A1* | 3/2011 | Dalessandro | 322/60 |
| 2011/0140534 A1* | 6/2011 | Yasugi | 307/80 |
| 2011/0175355 A1* | 7/2011 | Rosenvard | 290/44 |
| 2011/0291479 A1 | 12/2011 | Lee | |
| 2012/0139246 A1 | 6/2012 | Rafoth et al. | |
| 2012/0280665 A1 | 11/2012 | Su et al. | |
| 2012/0286512 A1* | 11/2012 | Biellmann | 290/46 |
| 2013/0016537 A1 | 1/2013 | Deng | |
| 2013/0027994 A1 | 1/2013 | Nelson et al. | |
| 2013/0082628 A1* | 4/2013 | Takegami | 318/139 |
| 2013/0113212 A1 | 5/2013 | Sakamoto et al. | |
| 2013/0154264 A1* | 6/2013 | Hatanaka et al. | 290/45 |
| 2013/0181688 A1 | 7/2013 | Tupper et al. | |
| 2013/0184884 A1* | 7/2013 | More et al. | 700/291 |
| 2013/0193766 A1 | 8/2013 | Irwin et al. | |
| 2013/0200617 A1* | 8/2013 | Smith et al. | 290/43 |
| 2013/0200620 A1* | 8/2013 | Gupta et al. | 290/44 |
| 2013/0208522 A1* | 8/2013 | Monjean et al. | 363/142 |
| 2013/0264882 A1* | 10/2013 | Abasolo et al. | 307/80 |
| 2013/0285491 A1* | 10/2013 | Kuznetsov | 310/71 |
| 2013/0343111 A1 | 12/2013 | Nelson | |
| 2014/0152109 A1* | 6/2014 | Kanakasabai et al. | 307/66 |
| 2014/0225369 A1* | 8/2014 | Bodewes | 290/44 |
| 2015/0001848 A1* | 1/2015 | Imaie et al. | 290/44 |

FOREIGN PATENT DOCUMENTS

| | | |
|---|---|---|
| EP | 2114001 A1 | 4/2009 |
| EP | 2166225 A1 | 3/2010 |
| EP | 2283233 B1 | 5/2011 |
| EP | 2565443 A1 | 3/2013 |
| JP | 6249828 A | 3/1987 |
| WO | 0125628 A2 | 4/2001 |
| WO | 2009110648 A1 | 9/2009 |
| WO | 2011058170 A1 | 5/2011 |
| WO | 2011124258 A1 | 10/2011 |
| WO | WO 2012026026 A1 * | 3/2012 |
| WO | 2012103894 A2 | 8/2012 |

OTHER PUBLICATIONS

Fletcher, J., et al., "Introduction to Doubly-Fed Induction Generator for Wind Power Applications," Paths to Sustainable Energy, Dec. 30, 2010, pp. 259-278, InTech.

Keshavarz, S. "Design and Evaluation of an Active Rectifier for a 4.1 MW Off-Shore Wind Turbine," Master of Science Thesis, Chalmers University of Technology, 2011, pp. a-42, Göteborg, Sweden.

Pekarek, S., et al., "ACSL/Graphic Modeller component models for electric power education," IEEE Transactions on Education, Nov. 1998, Subsection D. "Six-pulse bride rectifier," vol. 41, No. 4, IEEE Education Society.

Zargari, Navid R. et al., "A Multilevel Thyristor Rectifier with Improved Power Factor", IEEE Transactions on Industry Applications, vol. 33, No. 5, Sep./Oct. 1997, 1208-1213.

Xiang, D. et al., "Coordinated Control of an HVDC Link and Doubly Fed Induction Generators in a Large Offshore Wind Farm", IEEE Transactions on Power Delivery, vol. 21, No. 1, Jan. 2006, pp. 463-471.

\* cited by examiner

US 9,334,749 B2

AUXILIARY POWER SYSTEM FOR TURBINE-BASED ENERGY GENERATION SYSTEM

TECHNICAL FIELD

The instant application relates to turbine-based energy generation systems, and more particularly to turbine-based energy generation systems having powered auxiliary loads.

BACKGROUND

Energy from a turbine is converted into a form suitable for collection of energy from multiple turbines. This is preferably done cost-effectively, safely, and with few system failures. The power conversion chain of a conventional wind turbine typically includes a rotor assembly, a gear box connecting the rotor assembly to an electric generator, and a step-up transformer electrically coupling the electric generator to an AC-to-AC converter. The wind turbine also includes an auxiliary load that implements various wind turbine functions such as control, communication, safety, etc. The auxiliary load may be required to be powered even when the electric generator outputs insufficient power. The wind turbine is typically shut down when the auxiliary load loses power.

Auxiliary power for wind turbines with an AC output is conventionally realized by providing a three-winding transformer at the AC output of the turbine, which is not easily achieved when the turbine output is DC. A turbine with DC output ideally must provide auxiliary power through other means which must have a very high availability and should provide power for various processes including start-up and safe shutdown of the wind turbine.

SUMMARY

A turbine-based energy generation system is described herein which includes a main converter for delivering power generated by an internal electric generator to a power collection system external to the turbine-based energy generation system, and an auxiliary converter for delivering power to an auxiliary load of the turbine-based energy generation system regardless of whether the electric generator is generating power. This way, the auxiliary load may be powered even if the wind turbine is not generating any power.

According to an embodiment of a power system for a turbine-based energy generation system including an electric generator and an auxiliary load, the power system comprises a main converter and an auxiliary converter. The main converter is operable to deliver power generated by the electric generator to a power collection system external to the turbine-based energy generation system when the main converter is coupled to the generator. The main converter is also operable to deliver power provided from the power collection system to the auxiliary converter when the main converter is decoupled from the generator. The auxiliary converter is operable to deliver power generated by the electric generator to the auxiliary load when the auxiliary converter is coupled to the generator. The auxiliary converter is also operable to deliver the power provided by the main converter from the power collection system to the auxiliary load when the auxiliary converter is decoupled from the generator.

According to an embodiment of a method of providing power to an auxiliary load of a turbine-based energy generation system also including an electric generator, a main converter and an auxiliary converter, the method comprises: delivering power generated by the electric generator to a power collection system external to the turbine-based energy generation system via the main converter when the main converter is coupled to the generator; delivering power generated by the electric generator to the auxiliary load via the auxiliary converter when the auxiliary converter is coupled to the generator; delivering power provided from the power collection system to the auxiliary converter via the main converter when the main converter is decoupled from the generator; and delivering the power provided by the main converter from the power collection system to the auxiliary load via the auxiliary converter when the auxiliary converter is decoupled from the generator.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
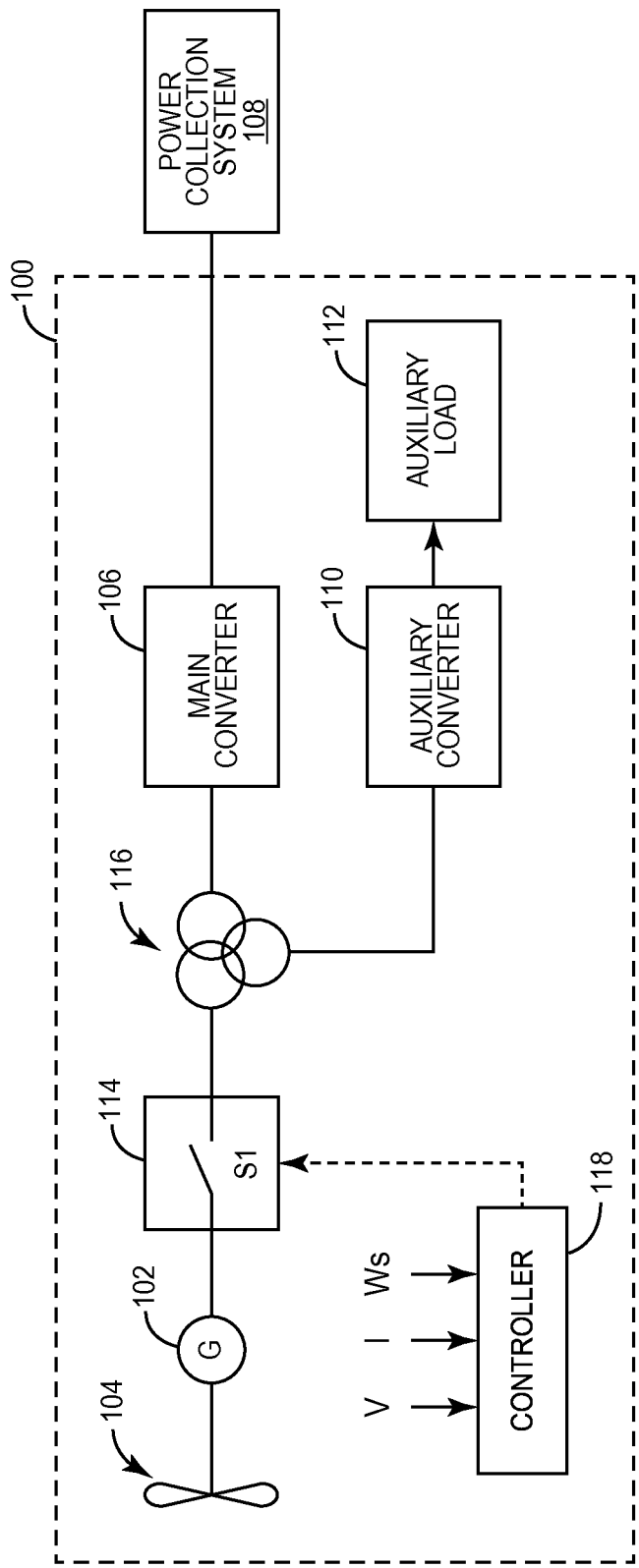
FIG. 1 illustrates a block diagram of an embodiment of a turbine-based energy generation system which includes a main converter, an auxiliary converter and an auxiliary load.

FIG. 1 illustrates an embodiment of a turbine-based energy generation system 100 which includes an electric generator (G) 102 for converting mechanical energy from a rotor assembly 104 into AC electrical energy, and a main converter 106 for converting the AC electrical energy to AC or DC electrical energy at the turbine system output for delivery to a power collection system 108 external to the turbine-based energy generation system 100. The rotor assembly 104 extracts energy from a fluid flow such as air or other gas, or water or other liquid. For example, the rotor assembly 104 can be a wind, wave, or tidal turbine rotor assembly which converts extracted energy into mechanical energy. Tangential components of the system 100 which are not germane to the invention are excluded from FIG. 1 for ease of illustration, such as AC breakers, gear boxes, brake systems, monitoring equipment, etc.

The turbine-based energy generation system 100 further includes an auxiliary converter 110 in addition to the main converter 106. The auxiliary converter 110 delivers power to the auxiliary load 112 of the turbine-based energy generation system 100 regardless of whether the electric generator 102 is generating power. The auxiliary load 112 implements various turbine-related functions such as control, communication, safety, etc. The auxiliary load 112 may be required to be powered, even when the electric generator 102 outputs insufficient power. During normal operation when the generator 102 outputs sufficient power, the main converter 106 is coupled to the generator 102 and delivers power from the generator 102 to the external power collection system 108. The auxiliary converter 110 similarly delivers power from the electric generator 102 to the auxiliary load 112 when the auxiliary converter 110 is coupled to the generator 102. When the electric generator 102 outputs insufficient power, the auxiliary converter 110 is decoupled from the generator 102 and delivers power provided by a source other than the generator 102 to the auxiliary load 112.

According to the embodiment shown in FIG. 1, the external power collection system 108 serves as the auxiliary power source when the electric generator 102 is decoupled from the main and auxiliary converters 106, 110. Power from the external power collection system 108 is delivered to the auxiliary converter 110 through the main converter 106 when the generator 102 is decoupled from the converters 106, 110. The auxiliary converter 110 in turn delivers the power provided by the main converter 106 from the power collection system 108 to the auxiliary load 112 for powering the auxiliary load 112 even though the generator 102 is decoupled from the auxiliary converter 110. The turbine-based energy generation system 100 can include a switch module 114 which contains one or more mechanical and/or power electric switches (S) such as IGBTs (insulated gate bipolar transistors) or thyristors for coupling and decoupling the electric generator 102 from the main and auxiliary converters 106, 110. The switch module 114 is interposed between the electric generator 102 and the main and auxiliary converters 106, 110.

In one embodiment as shown in FIG. 1, a three-winding transformer 116 connects the auxiliary converter 110, the switch module 114 and the main converter 106. The turbine-based energy generation system 100 of FIG. 1 also includes a controller 118 for controlling the switch module 114 responsive to a power generation criterion monitored by the controller 118 such as voltage (V) of the electric generator 102, current (I) of the generator 102 and/or wind speed (Ws) in the case of a wind turbine. Voltage, current and wind speed sensing are well known techniques in the turbine-based power generation art, and therefore no further explanation is given in this regard. The power generation criterion indicates whether the electric generator 102 is generating power at a sufficiently high level. For example in the case of a wind turbine, wind speed provides an accurate indication as to whether the electric generator 102 is generating power at a sufficiently high level.

The controller 118 closes the switch module 114 if the power generation criterion exceeds a first threshold (i.e. the electric generator 102 is generating power at a sufficiently high level) so that the electric generator 102 is coupled to the main and auxiliary converters 106, 110. In this configuration, some fraction of the power produced by the generator 102 is drawn by the auxiliary converter 110 for powering the auxiliary load 112 while the remainder of the power is fed by the main converter 106 to the external power collection system 108. If the power generation criterion is below a second threshold (i.e. the electric 102 generator is generating power below a sufficiently high level), the controller 118 opens the switch module 114 so that the electric generator 102 is decoupled from the main and auxiliary converters 106, 110. In this configuration, the main converter 106 delivers enough power from the external power collection system 108 to the auxiliary converter 110 to meet the demand of the auxiliary load 112. The first and second thresholds can be the same or different. The main converter 106 is bidirectional according to this embodiment. The auxiliary converter 110 can be bidirectional or unidirectional.

In the case of wind speed being used as the power generation criterion, the controller 118 opens the switch module 114 when the wind speed is below the cut-in speed of the rotor assembly 104 connected to the electric generator 102. Cut-in speed is the minimum wind speed at which a wind turbine generates usable power. This way, the auxiliary converter 110 maintains a high availability of power to the auxiliary load 112 irrespective of the availability of wind. Alternatively or in addition, the controller 118 can switch the switch module 114 under zero-current switching conditions by appropriate control of the main and auxiliary converters 106, 110. The controller 118 implements appropriate control of the main and auxiliary converters 106, 110 during zero-current switching operation so that the switch module 114 can be switched from one state to the other (from open to closed or vice-versa) when little or no appreciable current flows through the switch module 114, ensuring the life of the switch module 114 is not unnecessarily shortened.

In the case of the external power collection system 108 being a DC power collection system, the main converter 106 can convert AC electrical energy from the electric generator 102 to DC electrical energy which is delivered to the external DC power collection system 108 when the main converter 106 is coupled to the generator 102 via the switch module 114. For example, the main converter 106 can be an MMC (modular multilevel converter). An MMC converts between AC and DC electrical energy and has a converter leg for each phase of the AC electrical energy. Each converter leg has an upper arm with a first plurality of unipolar or bipolar modules and a lower arm with a second plurality of unipolar or bipolar modules. Each unipolar or bipolar module functions as a controlled unipolar or bipolar voltage source. When the switch module 114 is opened, the generator 102 is decoupled from the converters 106, 110 and DC electrical energy from the external DC power collection system 108 is converted to AC electrical energy by the bidirectional main converter 106 and delivered to the auxiliary converter 110 for powering the auxiliary load 112. In the case of a wind turbine connected to a DC collection system, auxiliary power is available even in the absence of internal power generation by the wind turbine without requiring a separate high voltage converter.

Figure 2:
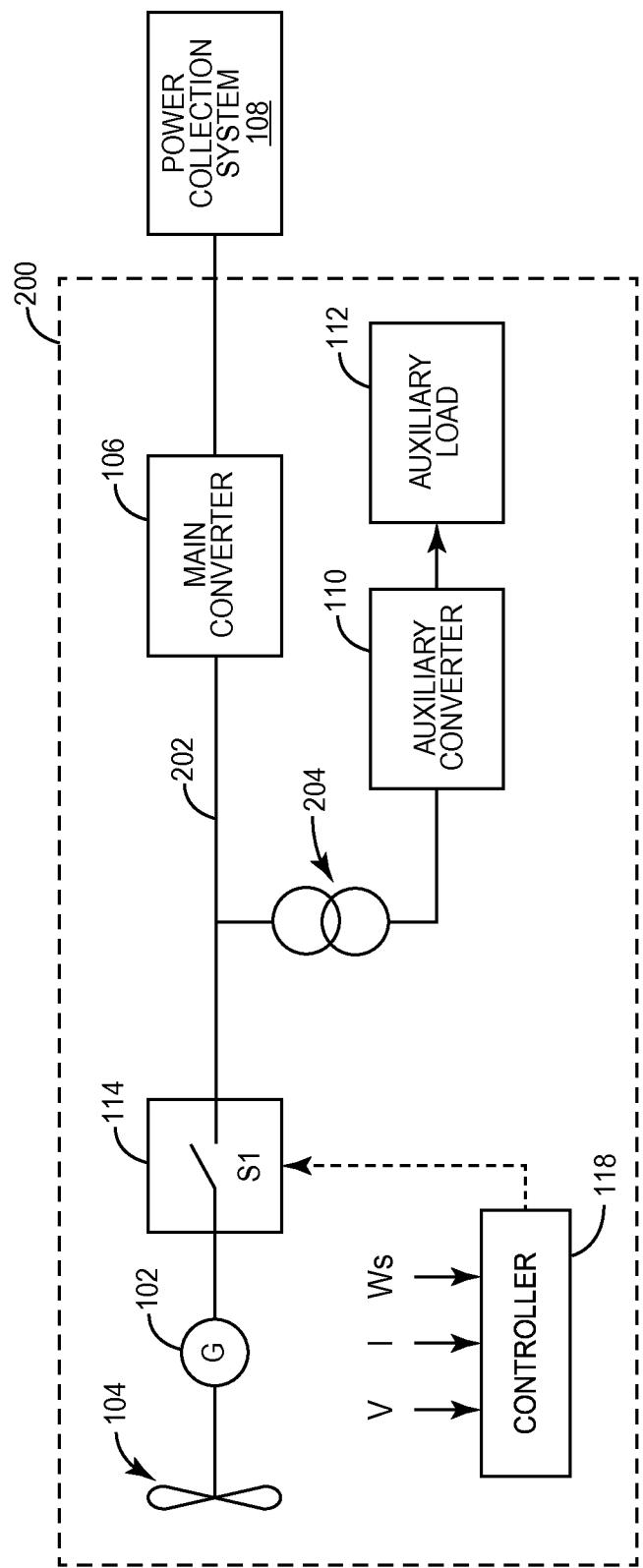
FIG. 2 illustrates a block diagram of another embodiment of a turbine-based energy generation system which includes a main converter, an auxiliary converter and an auxiliary load.

FIG. 2 illustrates another embodiment of a turbine-based energy generation system 200. The embodiment shown in FIG. 2 is similar to the embodiment shown in FIG. 1, however the switch module 114 is directly connected to the main converter 106 e.g. by a 3-phase bus 202 and a two-winding transformer 204 connects the auxiliary converter 110 to the main converter 106 and the switch module 114.

Figure 3:
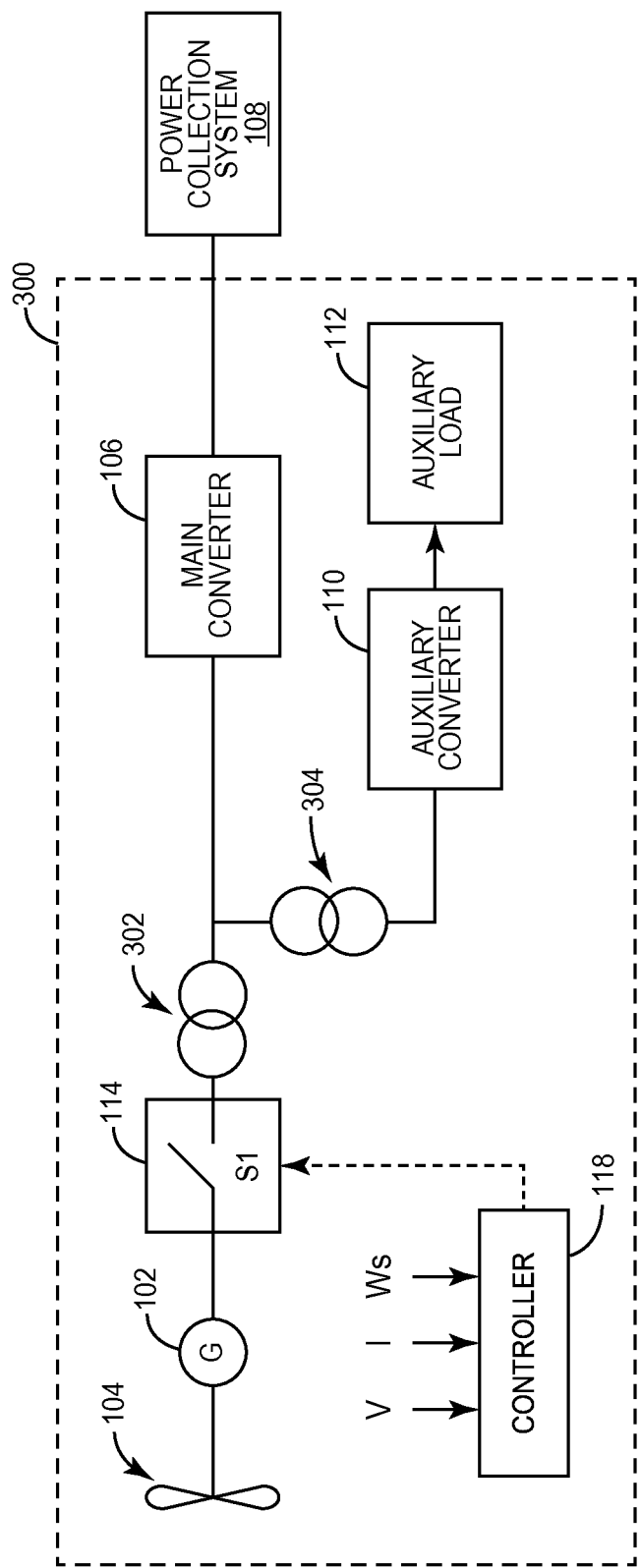
FIG. 3 illustrates a block diagram of yet another embodiment of a turbine-based energy generation system which includes a main converter, an auxiliary converter and an auxiliary load.

FIG. 3 illustrates yet another embodiment of a turbine-based energy generation system 300. The embodiment shown in FIG. 3 is similar to the embodiment shown in FIG. 1, however a first two-winding transformer 302 connects the switch module 114 to the main converter 106 and a second two-winding transformer 304 connects the auxiliary converter 110 to the first two-winding transformer 302 and the main converter 106.

Figure 4:
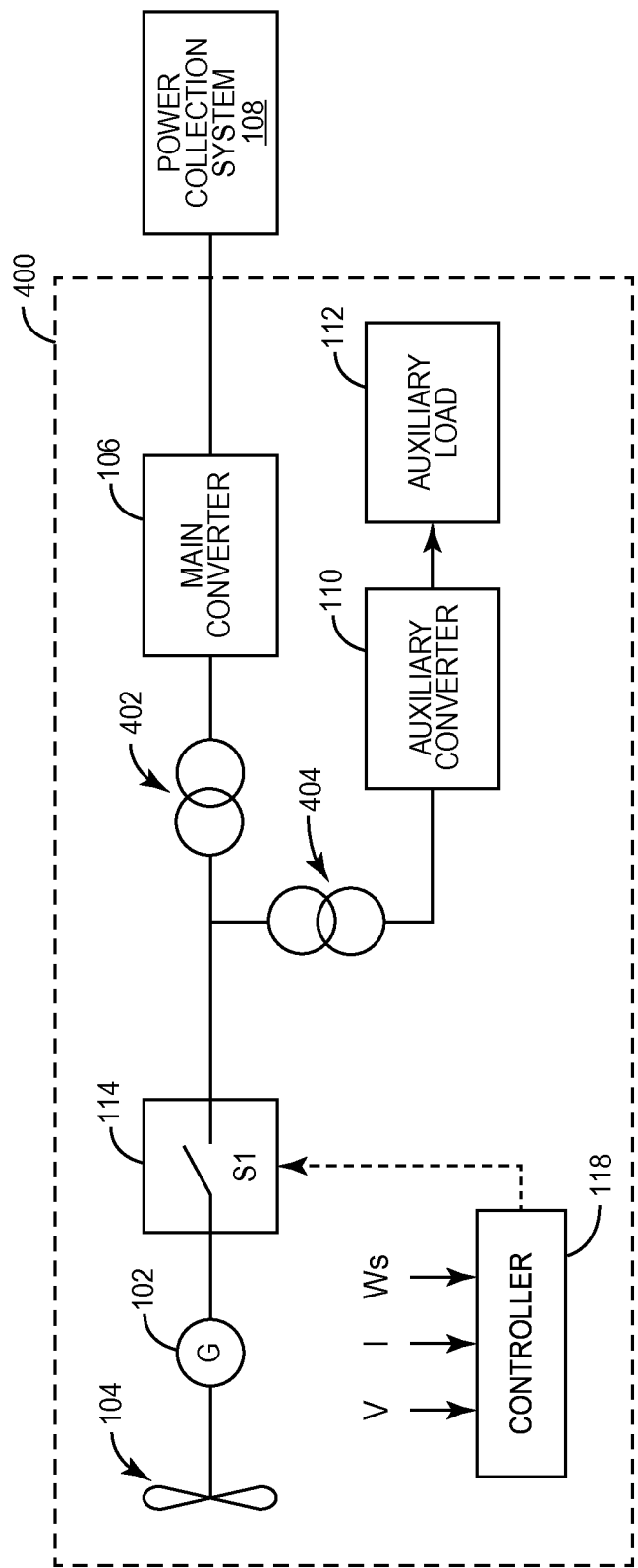
FIG. 4 illustrates a block diagram of still another embodiment of a turbine-based energy generation system which includes a main converter, an auxiliary converter and an auxiliary load.

FIG. 4 illustrates still another embodiment of a turbine-based energy generation system 400. The embodiment shown in FIG. 4 is similar to the embodiment shown in FIG. 3, however a first two-winding transformer 402 connects the switch module 114 to the main converter 106 and a second two-winding transformer 404 connects the auxiliary converter 110 to the first two-winding transformer 402 and the switch module 114.

Figure 5:
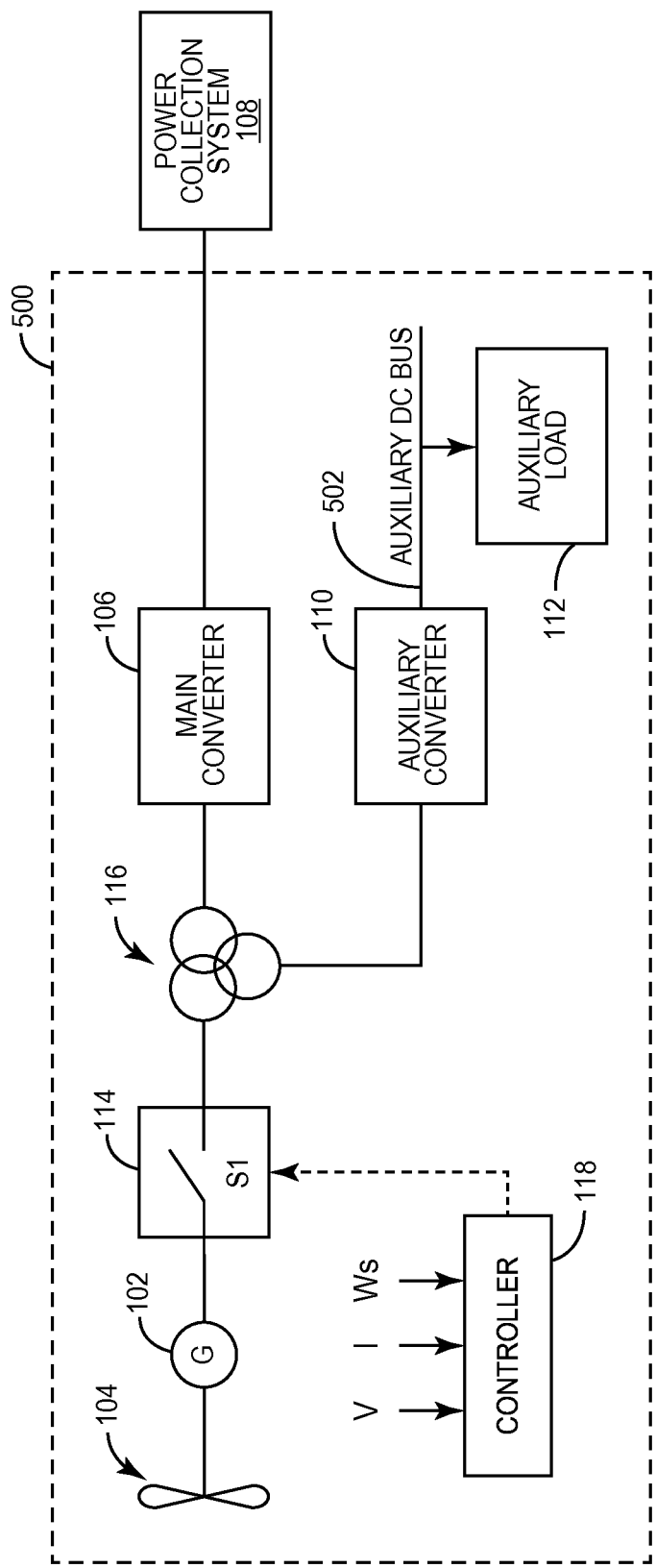
FIG. 5 illustrates a block diagram of an embodiment of a turbine-based energy generation system which includes a main converter, an auxiliary converter and an at least partly DC auxiliary load.

FIG. 5 illustrates an embodiment of a turbine-based energy generation system 500 which is similar to the embodiment shown in FIG. 1, however the auxiliary load 112 of the turbine-based energy generation system 500 at least partly requires DC power. For example in the case of a wind turbine, the auxiliary load 112 can include a pitch control circuit which is a drive-based load requiring a converter interface. The auxiliary converter 110 converts AC electrical energy at a first side of the auxiliary converter 110 toward the main converter 106 to DC electrical energy at a second side of the auxiliary converter 110 coupled to the at least partly DC load 112. The auxiliary power system can include a DC bus 502 for connecting the second side of the auxiliary converter 110 to the at least partly DC load 112. By providing the DC auxiliary bus 502, the number of power conversion stages of the auxiliary power system is reduced and the efficiency and cost of the auxiliary power system is improved.

Figure 6:
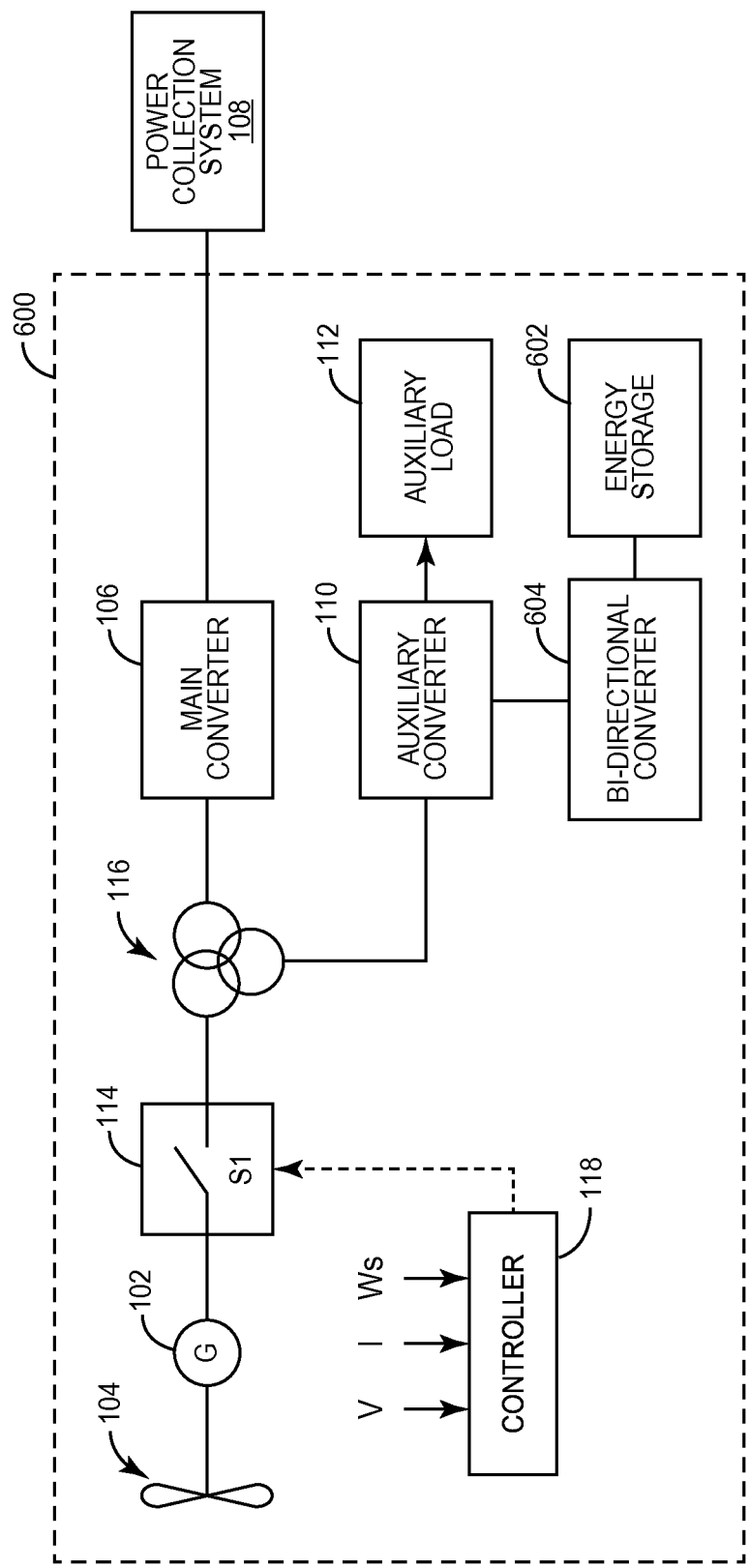
FIG. 6 illustrates a block diagram of an embodiment of a turbine-based energy generation system which includes a main converter, an auxiliary converter, an auxiliary load, and an energy storage device connected to the auxiliary converter.

FIG. 6 illustrates an embodiment of a turbine-based energy generation system 600 which is similar to the embodiment shown in FIG. 1, however the auxiliary power system also includes an energy storage device 602 such as a battery, battery bank, flywheel, etc. coupled to the auxiliary converter 110. The auxiliary converter 110 charges the energy storage device 602 with power drawn from the electric generator 102 during normal operation e.g. when the switch module 114 is closed. When the auxiliary converter 110 is decoupled from the generator 102 during a low power generating condition, the auxiliary converter 110 delivers power provided by the energy storage device 602 to the auxiliary load 112. In one embodiment, a bidirectional converter 604 couples the auxiliary converter 110 to the energy storage device 602 for enabling bidirectional power flow between the auxiliary converter 110 and the energy storage device 602 so that the energy storage device 602 and be charged and discharged as needed to supply the auxiliary load 112.

Figure 7:
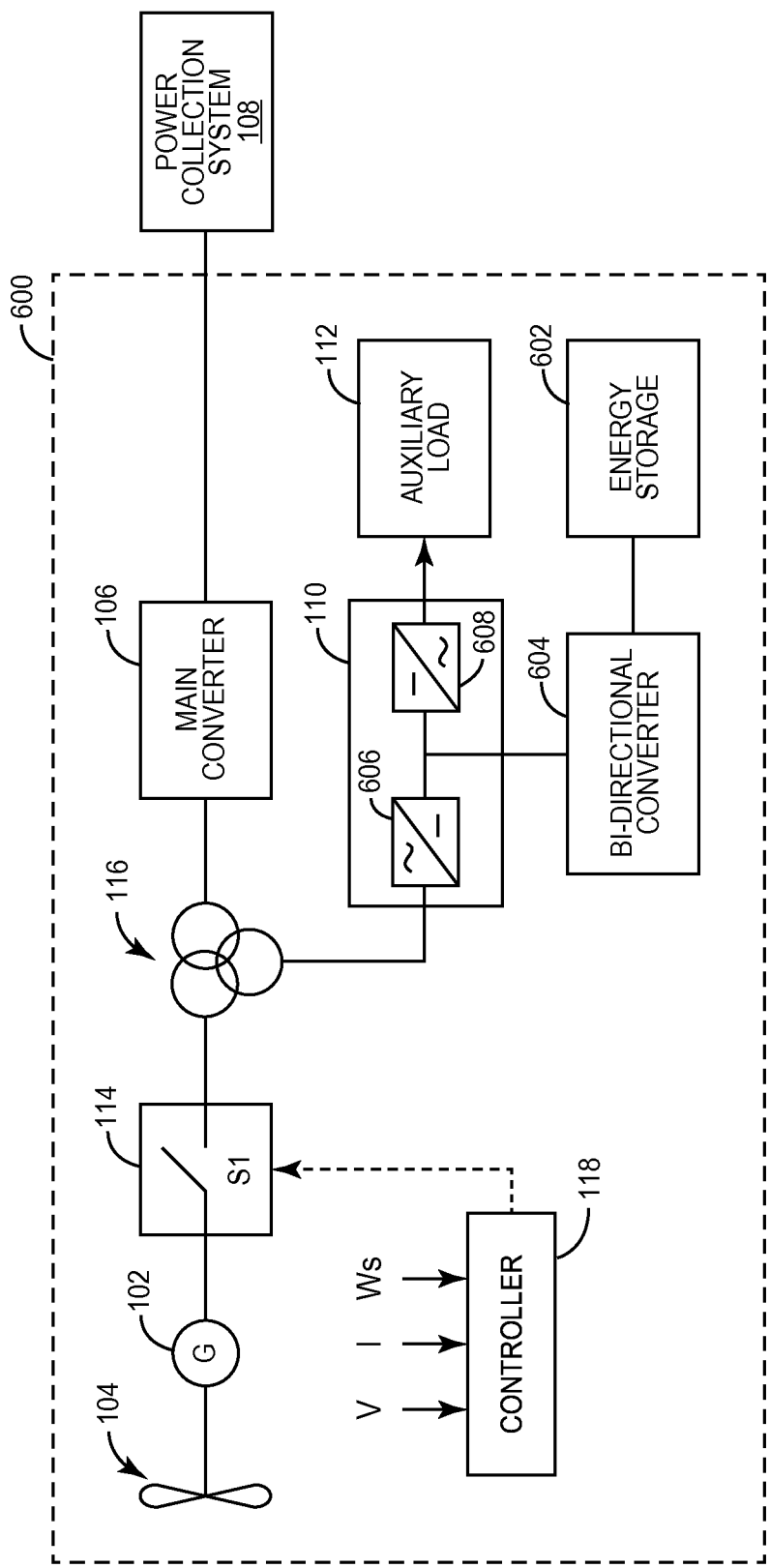
FIG. 7 illustrates a block diagram of another embodiment of a turbine-based energy generation system which includes a main converter, an auxiliary converter, an auxiliary load, and an energy storage device connected to the auxiliary converter.

FIG. 7 illustrates the turbine-based energy generation system 600 of FIG. 6 in more detail, according to an embodiment. The auxiliary converter 110 comprises a rectifier 606 for converting AC electrical energy from the electric generator 102 or the main converter 106 to DC electrical energy and an inverter 608 for converting the DC electrical energy back to AC electrical energy for powering the auxiliary load 112. The bidirectional converter 604 is connected between the rectifier 606 and the inverter 608 at one side and to the energy storage device 602 at another side.

The auxiliary converter, main converter, switch module, electric generator and rotor assembly are contained within a housing of the turbine-based energy generation system. The housing is not shown in the Figures for ease of illustration. The controller illustrated in the Figures can be a dedicated controller. For example, each of the converters has its own controller for managing operation of the individual converters as is well known in the turbine-based power generation art. Either one of these controllers also can be used to control the operation of the switch module in accordance with the teachings described herein. Alternatively, the controllers of the main and auxiliary converters can work in conjunction with each other or in a master-slave arrangement to control the switch module. In yet another embodiment, an additional controller different than the ones included in the main and auxiliary converters can be used to control the switch module.

Figure 8:
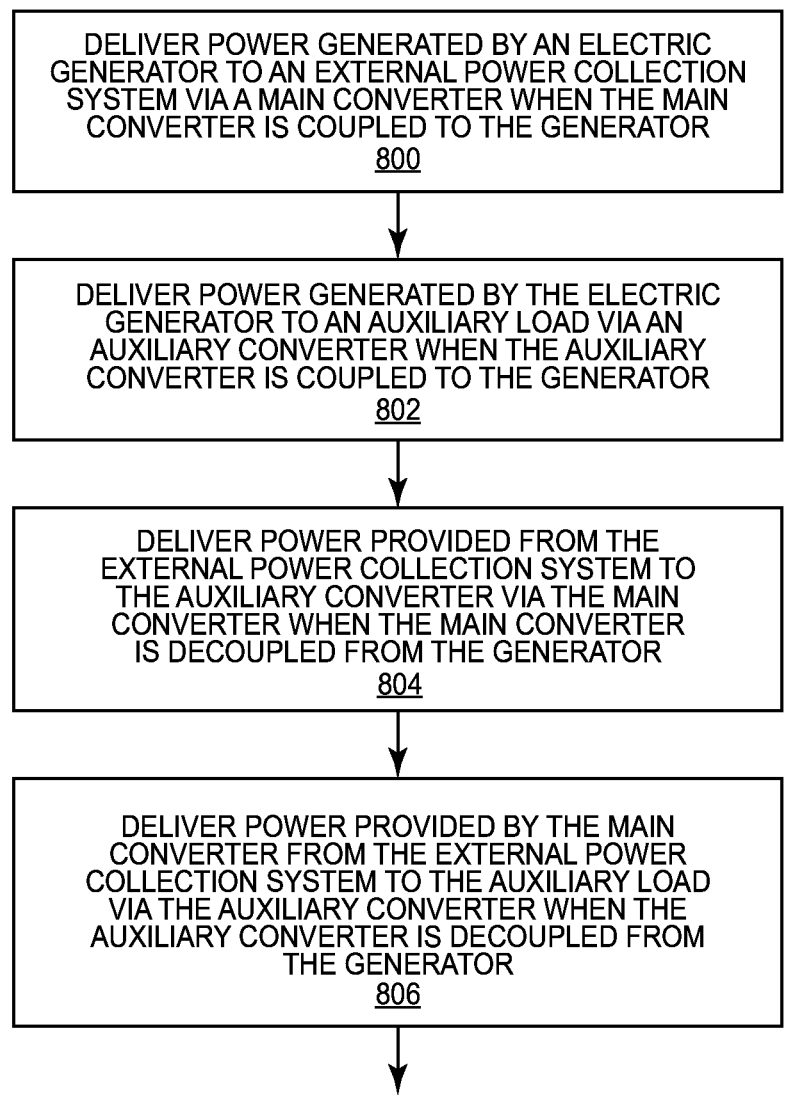
FIG. 8 illustrates an embodiment of a method of providing power to an auxiliary load of a turbine-based energy generation system.

FIG. 8 illustrates an embodiment of a method of providing power to an auxiliary load of a turbine-based energy generation system. The method comprises: delivering power generated by an electric generator of the turbine-based energy generation system to an external power collection system via a main converter of the turbine-based energy generation system when the main converter is coupled to the generator (800); delivering power generated by the electric generator to the auxiliary load via an auxiliary converter of the turbine-based energy generation system when the auxiliary converter is coupled to the generator (802); delivering power provided from the power collection system to the auxiliary converter via the main converter when the main converter is decoupled from the generator (804); and delivering the power provided by the main converter from the power collection system to the auxiliary load via the auxiliary converter when the auxiliary converter is decoupled from the generator (806).

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power system for a turbine-based energy generation system including an electric generator and an auxiliary load, comprising:
   a main converter;
   an auxiliary converter;
   a switch module interposed between the electric generator and the main and auxiliary converters; and
   a controller operable to close the switch module so that the electric generator is coupled to the main and auxiliary converters when a power generation criterion exceeds a first threshold and open the switch module so that the electric generator is decoupled from the main and auxiliary converters when the power generation criterion is below a second threshold,
   wherein the main converter is operable to deliver power generated by the electric generator to a power collection system external to the turbine-based energy generation system when the main converter is coupled to the generator and deliver power provided from the power collection system to the auxiliary converter when the main converter is decoupled from the generator,
   wherein the auxiliary converter is operable to deliver power generated by the electric generator to the auxiliary load when the auxiliary converter is coupled to the generator and deliver the power provided by the main converter from the power collection system to the auxiliary load when the auxiliary converter is decoupled from the generator.

2. The power system of claim 1, further comprising an energy storage device coupled to the auxiliary converter, and wherein the auxiliary converter is operable to deliver power provided by the energy storage device to the auxiliary load when the auxiliary converter is decoupled from the generator.

3. The power system of claim 2, further comprising a bidirectional converter coupling the auxiliary converter to the energy storage device.

4. The power system of claim 3, wherein the auxiliary converter comprises a rectifier operable to convert AC electrical energy from the electric generator or the main converter to DC electrical energy and an inverter operable to convert the DC electrical energy back to AC electrical energy for the auxiliary load, and wherein the bidirectional converter is connected between the rectifier and the inverter at one side and to the energy storage device at another side.

5. The power system of claim 1, wherein the main converter is a bidirectional converter operable to convert AC electrical energy from the electric generator to DC electrical energy delivered to the power collection system when the main converter is coupled to the generator and convert DC electrical energy from the power collection system to AC electrical energy delivered to the auxiliary converter when the main converter is decoupled from the generator.

6. The power system of claim 5, wherein the bidirectional converter is a modular multilevel converter.

7. The power system of claim 1, wherein the auxiliary load is at least partly a DC load and the auxiliary converter is operable to convert AC electrical energy at a first side of the auxiliary converter to DC electrical energy at a second side of the auxiliary converter coupled to the at least partly DC load.

8. The power system of claim 7, further comprising a DC bus connecting the second side of the auxiliary converter to the at least partly DC load.

9. The power system of claim 1, further comprising a three-winding transformer connecting the auxiliary converter, the switch module and the main converter.

10. The power system of claim 1, further comprising:
a first two-winding transformer connecting the switch module to the main converter; and
a second two-winding transformer connecting the auxiliary converter to the first two-winding transformer and the main converter.

11. The power system of claim 1, further comprising:
a first two-winding transformer connecting the switch module to the main converter; and
a second two-winding transformer connecting the auxiliary converter to the first two-winding transformer and the switch module.

12. The power system of claim 1, wherein the power generation criterion comprises at least one of voltage of the electric generator, current of the electric generator and wind speed.

13. The power system of claim 12, wherein the controller is operable to open the switch module when the wind speed is below a cut-in speed of a rotor assembly connected to the electric generator.

14. The power system of claim 1, wherein the controller is operable to switch the switch module under zero-current switching conditions.

15. A method of providing power to an auxiliary load of a turbine-based energy generation system also including an electric generator, a main converter and an auxiliary converter, and a switch module interposed between the electric generator and the main and auxiliary converters, the method comprising:
delivering power generated by the electric generator to a power collection system external to the turbine-based energy generation system via the main converter when the main converter is coupled to the generator;
delivering power generated by the electric generator to the auxiliary load via the auxiliary converter when the auxiliary converter is coupled to the generator;
delivering power provided from the power collection system to the auxiliary converter via the main converter when the main converter is decoupled from the generator;
delivering the power provided by the main converter from the power collection system to the auxiliary load via the auxiliary converter when the auxiliary converter is decoupled from the generator;
closing the switch module so that the electric generator is coupled to the main and auxiliary converters when a power generation criterion exceeds a first threshold; and
opening the switch module so that the electric generator is decoupled from the main and auxiliary converters when the power generation criterion is below a second threshold.

16. The method of claim 15, wherein the turbine-based energy generation system further comprises an energy storage device coupled to the auxiliary converter, the method further comprising:
delivering power provided by the energy storage device to the auxiliary load via the auxiliary converter and a bidirectional converter coupling the auxiliary converter to the energy storage device when the auxiliary converter is decoupled from the generator.

17. The method of claim 15, wherein the main converter is a bidirectional converter, the method further comprising:
converting AC electrical energy from the electric generator to DC electrical energy by the bidirectional converter for delivery to the power collection system when the main converter is coupled to the generator; and
converting DC electrical energy from the power collection system to AC electrical energy by the bidirectional converter for delivery to the auxiliary converter when the main converter is decoupled from the generator.

18. The method of claim 15, wherein the auxiliary load is at least partly a DC load, the method further comprising:
converting AC electrical energy at a first side of the auxiliary converter to DC electrical energy at a second side of the auxiliary converter coupled to the at least partly DC load; and
connecting the second side of the auxiliary converter to the at least partly DC load via a DC bus.

19. The method of claim 15, wherein the turbine-based energy generation system further comprises a rotor assembly connected to the electric generator, the method further comprising:
opening the switch module when the wind speed is below a cut-in speed of the rotor assembly.

20. The method of claim 15, further comprising:
switching the switch module under zero-current switching conditions.

* * * * *